United States Patent [19]

Powers

[11] 4,062,277
[45] Dec. 13, 1977

[54] DEFROSTING APPARATUS

[75] Inventor: Gilbert L. Powers, South Pasadena, Calif.

[73] Assignee: W. B. Van Nest Company, Excelsior, Minn.

[21] Appl. No.: 616,033

[22] Filed: Sept. 22, 1975

Related U.S. Application Data

[63] Continuation of Ser. No. 441,663, Feb. 11, 1974, abandoned.

[51] Int. Cl.$^2$ .......................... A23C 3/02; A23C 9/02; A23B 4/08; B05B 15/00
[52] U.S. Cl. ........................................ 99/483; 99/516; 239/450
[58] Field of Search .................................. 99/516–517, 99/487, 485, 483; 239/450, 71, 74; 134/177, 260; 62/81, 274, 282, 82; 222/544; 138/34, 166; 160/84, 48; 312/214

[56] References Cited

U.S. PATENT DOCUMENTS

| 1,429,069 | 9/1922 | Dunn | 134/177 |
| 2,749,180 | 6/1956 | Andrews | 239/450 |
| 2,885,878 | 5/1959 | Kocay | 239/74 |
| 3,517,702 | 6/1970 | Mueller | 138/166 |

Primary Examiner—Leonard D. Christian
Assistant Examiner—Robert Pous
Attorney, Agent, or Firm—Schroeder, Siegfried, Ryan, Vidas & Steffey

[57] ABSTRACT

An apparatus for thawing of frozen food products is provided which includes a tank member having an open top which is provided with a specially constructed cover member which insures sanitary conditions during the thawing while at the same time minimizing the quantity of liquid utilized to thaw the frozen food. The cover member is constructed so as to define a reservoir chamber for the liquid used in thawing and is further provided with a plurality of inwardly facing openings so as to spray the liquid over the frozen food in the tank. Drain means are provided so that the food being thawed is never immersed in liquid but rather has a flowing thin film of liquid over its surface. Low temperatures are utilized thereby decreasing the rate of bacterial activity within the product being thawed.

8 Claims, 4 Drawing Figures

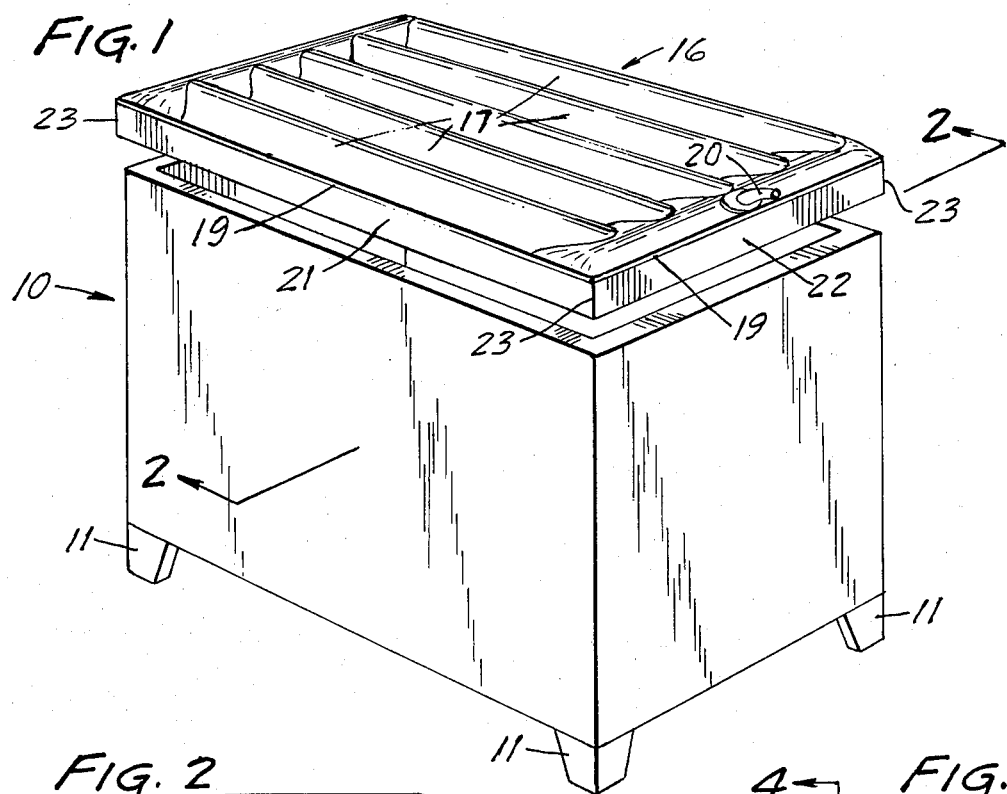
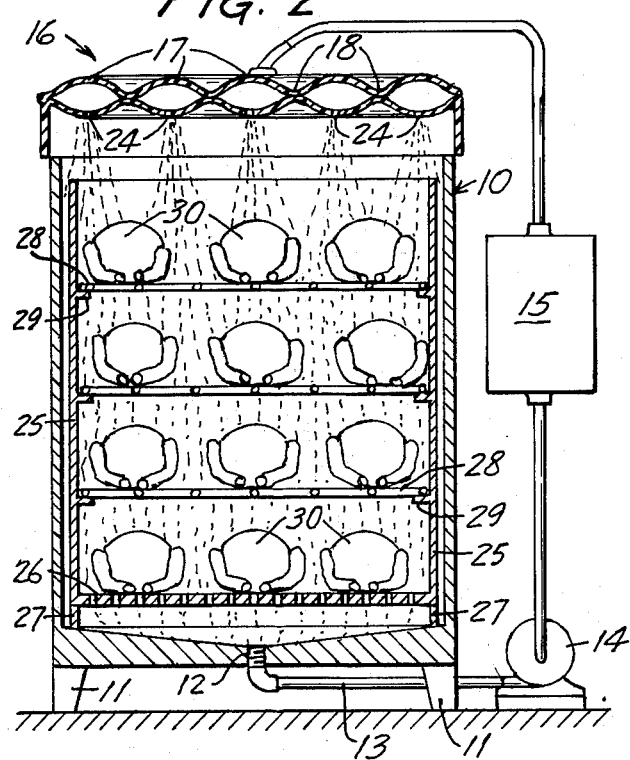
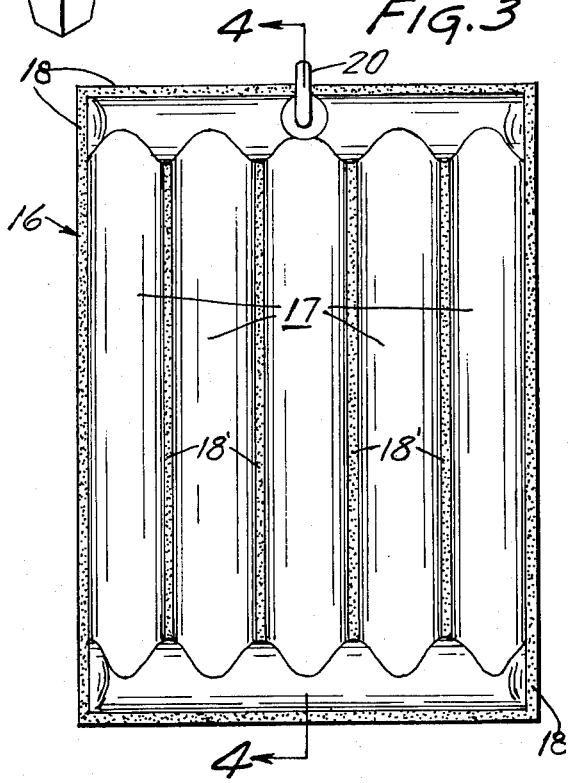
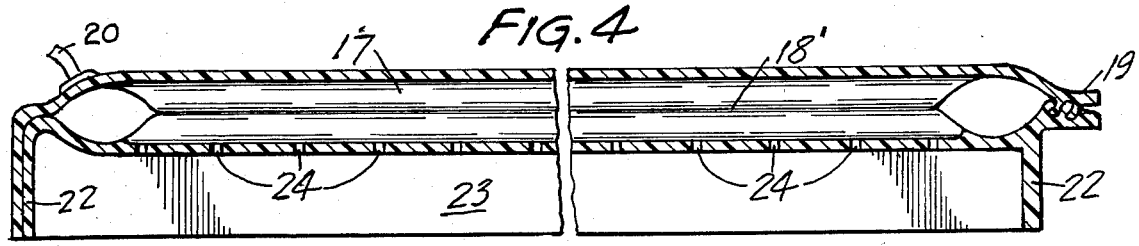

DEFROSTING APPARATUS

This is a continuation of application Ser. No. 441,663, filed Feb. 11, 1974 and now abandoned.

The present invention is directed to the field of thawing of frozen food and is more particularly concerned with the thawing of frozen meat products. While the invention will find use in the thawing of many types of meat products, it is described hereinbelow in connection with the thawing of frozen poultry and in particular the thawing of frozen turkeys.

The majority of turkeys are frozen following the slaughtering and eviscerating operation. At a later date when further processing of the turkeys is desired, the turkeys must first be thawed. During this re-thawing operation, a number of conditions must be observed. The operation must be clean in keeping foreign materials away from the birds being thawed, the cost of the thawing operation should be kept at a minimum, the time involved in the thawing operation should be kept at a minimum, and the extent of bacterial activity in the meat must likewise be kept at a minimum. These last two requirements are ordinarily in conflict with one another inasmuch as more rapid thawing can be accomplished by maintaining a high temperature gradient between the meat of the bird and the environment supplying heat. However, the rate of bacterial growth is directly a function of the temperature. If the outer surface of the bird during the thawing operation is at a relatively high temperature, bacterial activity and consequent deterioration of the meat becomes excessively high.

In accordance with the present invention, apparatus and procedures are provided which improve markedly over prior art practices in the thawing of frozen meats and in particular in the thawing of frozen avian. The invention will be best understood by a study of the drawings and corresponding text material which follows.

IN THE DRAWINGS

FIG. 1 is an exploded view in perspective of a defrosting tank and cover member in accordance with the invention;

FIG. 2 is a cross-sectional view of the tank and cover of FIG. 1 along line 2—2 and includes an optional rack arrangement for holding the meat to be thawed;

FIG. 3 is a top plan view of a cover member in accordance with the invention; and FIG. 4 is a cross-sectional view of a portion of the cover member of FIG. 3 along line 4—4 of FIG. 3.

In the several views which follow, like parts will be given the same numerical designation.

Referring now to the drawings, there is shown a generally rectangular thawing tank 10 which may be conveniently made of a material such as stainless steel. Typical dimensions will be 4'×6' with a depth of 3-4 feet. The tank may, of course, be made of a variety of other materials. The tank may be non-coated or in appropriate instances coated for cleanliness and corrosion protection. Leg members 11 support the tank in raised position above the floor. The bottom inside of the tank is provided with a sloped surface seen best in FIG. 2 which terminates at its lowest point at a drain hole 12. Connected to drain 12 is a conduit 13. A pump 14 and combined filter, heat exchanger and temperature controller, shown schematically as 15, are provided which recirculates the liquid utilized to thaw the meat which is to be placed within the tank 10 and adjusts the temperature of the thawing liquid to a predetermined value.

While the invention will be described with regard to a rectangular tank, it should be appreciated that the invention is equally applicable to other configurations.

A cover member generally designated 16 is constructed in a manner to provide a complete closure of the upper end of tank 10. In the preferred form of the invention, cover member 16 is formed of a flexible material such as plastic. While a variety of plastic materials may be utilized, a thermoplastic heat sealable material such as polyvinylchloride or clear polyethylene or polypropylene is particularly advantageous. These materials are low cost and can be readily heat sealed into the configurations of the cover of the invention. In the case of the use of clear plastic materials, a ready visual check of the accumulation of any foreign materials within the cover is provided. The advantages of use of plastic material are multiple. In addition to those enumerated above, the cover member is lightweight permitting installation on a tank by a single operator without need for lifting equipment. The flexibility of the cover member permits ready folding for storage of the covers when not in use.

The central portion of cover member 16 as shown in the drawings consists of a plurality of tubes 17 which are similar in construction to the tube structure of the common plastic air mattresses. These tubes can be conveniently formed by positioning two sheets of plastic in face-to-face relationship and then, where the material is thermoplastic, thermally joining the two sheets at the outer edges 18 and along parallel spaced intervals 18' to form the tubes 17. Alternatively, a single sheet may be folded so that the fold forms a pre-joined edge of two facing sheets. Bonding agents may be used to form seams 18 and 18' rather than thermal joining. The edges of these sheets are similarly joined at 18 around the perimeter of cover 16 with the exception of edge portion 19. The tube construction has a supportive effect on the cover lessening any tendency for sagging of the cover into the tank.

As can be best seen in FIG. 3, seam portions 18' do not extend the entire length of the sheet but leave each end portion of cover 16 open to each of tubes 17. A construction which is analogous to a manifold is thus produced. At one end of cover 16 there is provided an inlet tube 20 for introducing the liquid to be utilized in the thawing into the cover member. The opposite end 19 of cover 16 is desirably joined by some means such as a locking seam arrangement seen in cross-section in FIG. 4. The function of the openable seam 19 is to permit flushing of the tube arrangement to remove any foreign material which may accumulate within the tubes 17 during use. Liquid can be flowed rapidly therethrough and out through the open end 19 to clear the material and then the seam 19 can be reclosed. Of course, various clamping arrangements can be utilized to reinforce the holding effectiveness of the seam 19 shown in FIG. 4.

It is also contemplated that a locking seam arrangement such as seam 19 may be utilized to form the joining means for seams 18 and 18'. When cover 16 is formed of a single sheet such locking seams for 18, 18' and 19 permit access for thorough cleaning.

The sheets which are utilized to form the tubular sections 17 may also include flange regions 21 along the long side and 22 along the short sides of the cover.

These flanges are joined together by appropriate means which can also be heat sealing at the corners 23 to provide a construction similar to a fitted bed sheet.

As seen in FIGS. 2 and 4, a plurality of small holes 24 are provided spaced along the lengths of tubes 17 at the underside thereof to spray the thawing water downwardly into tank 10. The size of these holes is preferably small with a large number of holes being provided so as to distribute liquid in a uniform manner over the material to be thawed within tank 10. While no critical requirement exists for the size of the hole, they are desirably about 1/64 of an inch in diameter.

It is contemplated that the invention will be used in conjunction with thawing tanks wherein the frozen birds are merely piled on top of one another during the thawing operation. In such cases the sprayed thawing fluid will drain from the topmost birds consecutively down over the surface of underlying birds. However, when desired the birds may be spaced as will now be described.

Turning to FIG. 2, there is illustrated therein an interior racking assembly 25. This racking assembly is provided with a perforated bottom portion 26 which is suspended by means such as legs 27 above the lower surface of tank 10. This insures a complete drainage of the liquid used to thaw in a manner which will be described hereinbelow. Removable shelves 28 are provided which are suspended from lugs 29 as shown at spaces appropriate for the product to be thawed. The shelving members 28 desirably are formed of a coarse wire screening which permits ready drainage of liquid to be used during the thawing operation. Alternatively, the walls of tank 10 may be provided with shelf supports similar to 29 with removable shelves suspendable therefrom rather than having a separate rack 25.

The operation of the invention is now believed apparent. The turkeys to be thawed are placed into tank 10 either directly onto a false bottom similar to member 26 or into a removable rack assembly 25 as shown in FIG. 2. The cover member 16 is then form fitted over the top of tank 10 and the heat exchanging liquid (typically water) is pumped into the cover including tubes 17. In accordance with the invention, the heat exchange liquid is maintained below 50° F and preferably below 45° F at the initial stage of thawing. Sufficient pressure is provided to insure a steady spray of liquid down over the birds so that a generally steady and thin film of moving liquid passes over each bird. The rate of flow from tubes 17 is maintained at a sufficient level so that the immediate surface of the bird is maintained at a temperature close to that of the inflowing liquid.

As the liquid flows down over the birds, it collects in the base of tank 10 where it is pumped by means of pump 14 from the bottom and around through a combined filter and heat exchange system 15. Any solid materials which become entrained in the liquid will be removed by the filter and the heat exchanger can then raise the temperature of the liquid back up to the desired input temperature. This recycling is continued for a period of time sufficient to largely defrost the birds. The time required will, of course, be empirically determined and will depend upon the nature of the product, its initial temperature and its thickness through the greatest cross-section thereof. A thicker cross-section will, of course, take longer to thaw than will a thin cross-section of the same material.

As the bird approaches a complete thawing, the temperature of the input liquid is reduced down to a lower temperature of about 40° F. The purpose in lowering the temperature is to further minimize the amount of bacterial activity taking place in the carcass of the bird by lowering the skin temperature. By a process of equilibration the remaining frozen portions of the bird will become thawed by absorption of heat from the already thawed portions of the bird thereby lowering the temperature of these previously thawed portions so that the ultimate result is that the entire bird will be at a temperature close to the freezing temperature and yet completely thawed.

What is claimed is:

1. A system for thawing of frozen food products comprising:
    a. a tank for holding the products to be thawed, the sidewalls and base of said tank joined to define a closed container except for an open top and including drain means joined thereto adjacent the lower portion of said tank;
    b. a readily removable cover member of flexible plastic material providing a complete closure for the top of said tank to seal the contents from contamination, said cover member having upper and lower sheet members joined adjacent the peripheral edges to define a closed liquid receiving chamber, an inlet opening in said chamber for introducing thawing liquid into said chamber, the lower sheet member of said cover member which faces inwardly into said tank defining a plurality of small openings in fluid communication with said chamber, said openings being spaced from one another so as to provide a spray of thawing liquid over the product to be thawed, said cover member being collapsible and foldable when not in use so as to be conveniently storable;
    c. fluid conduit means connecting said drain means to said inlet opening in said chamber;
    d. pump means in said conduit means positioned intermediate said drain and said chamber; and
    e. heat exchange means including temperature control means in communication with said conduit means for adjusting the thawing liquid cycled therethrough to a predetermined temperature.

2. Apparatus for thawing of frozen food products comprising in combination:
    a. a tank for holding the product to be thawed, the sidewalls and base of said tank joined to define a closed container except for an open top, said tank including drain means adjacent the lower portion thereof; and
    b. a readily removable cover member of flexible plastic material providing a complete closure of the open top of said tank to seal the contents from contamination, said cover member being formed of two sheets of flexible plastic material joined together adjacent the outer periphery thereof to define a chamber and joined interiorly of the outer edges at a plurality of parallel intervals to thereby define a plurality of spaced parallel tube members, each of said tube members being in fluid communication with said chamber, the lower inwardly facing surface of said cover member along the lengths of said tube members including a plurality of small openings in fluid communication with said chamber, said cover member including connector means for joining said chamber to a source of thawing liquid, said cover member being collapsible and foldable when not in use so as to be conveniently storable.

3. Apparatus in accordance with claim 2 wherein said cover member includes a downwardly extending flange at the periphery thereof of a size to fit around the exterior top end of said tank.

4. A large generally rectangularly shaped cover member having a width a substantial portion of the length thereof having dependent flanges and adapted to enclose the top of and deliver a thawing fluid to an open topped tank holding frozen food comprising upper and lower sheets of flexible plastic material in opposed relationship to one another and joined to one another adjacent the outer edges thereof between said flanges to form a closed chamber, said sheets being further joined to one another by a plurality of spaced parallel seams, said seams extending from points interior to the opposite edges of said sheets to thereby define multiple numbers of parallel tubes with the transverse end regions of said sheets adjacent said outer edges and intermediate said tubes and the outer edges defining first and second manifolds at opposite end of said tubes in fluid connection with said tubes to thereby provide a uniform pressure in each of said tubes when a thawing liquid is being passed therethrough, a continuous plastic flange joined to the outer edges of said sheets and extending generally perpendicular to the plane of said sheets in the direction of said lower sheet, the lower sheet portions of said tubes defining a plurality of small openings therethrough uniformly spaced over the surface of each of said tubes for spraying fine streams of a thawing fluid onto the food to be thawed, and inlet means in a first of said manifolds for introducing said thawing fluid into said chamber, said cover member being collapsible and foldable when not in use so as to be conveniently storable.

5. A cover member in accordance with claim 4 wherein the joined outer edge of said sheets in the second manifold region are joined by means that are readily mechanically openable and resealable so as to provide a relatively large temporary opening at said second manifold for flushing the interior of said chamber free of foreign material.

6. A cover member in accordance with claim 4 wherein said flexible plastic material is selected from the group consisting of clear polyethylene and clear polypropylene so as to provide a visual indication of foreign materials within said chamber.

7. A cover member in accordance with claim 4 wherein said cover is of a size to close the open top of a thawing tank having dimensions of about 4' × 6'.

8. A cover member in accordance with claim 5 wherein said plastic material is clear polyethylene.

* * * * *